(12) United States Patent
Chang et al.

(10) Patent No.: US 7,499,681 B2
(45) Date of Patent: Mar. 3, 2009

(54) APPARATUS, SYSTEM, AND METHOD FOR MANAGING AN ANTENNA NETWORK DURING A HALF DUPLEX CALL

(75) Inventors: Henry Chang, San Diego, CA (US); Doug Dunn, Chula Vista, CA (US); Jorge Fabrega-Sanchez, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 536 days.

(21) Appl. No.: 11/317,497

(22) Filed: Dec. 22, 2005

(65) Prior Publication Data

US 2007/0149145 A1 Jun. 28, 2007

(51) Int. Cl.
*H01Q 11/12* (2006.01)

(52) U.S. Cl. .................. 455/120; 455/121; 455/277.1; 455/526; 455/77; 343/895; 343/853

(58) Field of Classification Search .................. 455/120, 455/121, 277.1, 526, 77, 87; 343/895, 853, 343/702
See application file for complete search history.

(56) References Cited

U.S. PATENT DOCUMENTS

| 4,309,773 | A | * | 1/1982 | Johnson et al. ............... 455/62 |
| 5,841,808 | A | * | 11/1998 | Rizzo et al. .................. 375/150 |
| 5,896,113 | A | * | 4/1999 | O'Neill, Jr. .................. 343/895 |
| 6,961,022 | B1 | | 11/2005 | Tay et al. |
| 2002/0111181 | A1 | * | 8/2002 | Jaybush et al. ............... 455/519 |
| 2004/0014428 | A1 | | 1/2004 | Franca-Neto |
| 2005/0245228 | A1 | * | 11/2005 | Candal et al. ................ 455/347 |
| 2006/0132360 | A1 | * | 6/2006 | Caimi et al. ........... 343/700 MS |
| 2006/0281423 | A1 | * | 12/2006 | Caimi et al. ................. 455/129 |

FOREIGN PATENT DOCUMENTS

| EP | 0813311 A2 | 12/1997 |
| WO | WO02/093778 A1 | 11/2002 |
| WO | WO02/093948 A1 | 11/2002 |

* cited by examiner

*Primary Examiner*—Minh D Dao

(57) ABSTRACT

An apparatus, system, and method dynamically adjust an antenna network frequency response in accordance with an operation mode of a half duplex call. One of a plurality of antenna network configurations is selected based at least partly on the half duplex operation mode which comprises a talk mode and a listen mode. When the portable communication device is in a listen mode, the antenna network is tuned to a reception configuration which results in a reception efficiency that is greater for at least a portion of a reception frequency band than the reception efficiency resulting from at least one other antenna network configuration. The antenna network is maintained in a default configuration unless antenna adjustment conditions are met. In some situations, the antenna network is set to a transmission configuration to improve transmission efficiency relative to the default configuration.

20 Claims, 3 Drawing Sheets

APPARATUS, SYSTEM, AND METHOD FOR MANAGING AN ANTENNA NETWORK DURING A HALF DUPLEX CALL

FIELD OF THE INVENTION

The invention relates in general to portable communication devices and more specifically to an apparatus, system, and method for managing an antenna network of a portable communication device.

BACKGROUND OF THE INVENTION

Portable communication devices such as cellular telephones and wireless personal digital assistants (PDAs) transmit and receive electromagnetic waves through an antenna. In addition to other factors, the efficiency and quality of communication is based on the characteristics of the antenna. The antenna efficiency over a frequency band is often compromised to meet size and shape requirements of the portable communication device designs. In addition, portable communication devices may transmit and receive within different frequency bands requiring the antenna to have sufficient performance over both frequency bands. In conventional portable communication devices, the performance within one or both of the frequency bands is compromised to maintain an antenna operational bandwidth that incorporates both of the frequency bands. In addition, the link budget for either the uplink or downlink is fixed in conventional communication devices. Link budget is a system parameter that refers to the amount of transmission power and receiver sensitivity needed to establish a communication link between the base station and the communication device through a wireless communication channel. The link budget takes into account propagation loss, cable losses, and antenna directivity. During half duplex communication, such as push-to-talk (PTT) or one-way file transfers, the link budget for the communication direction (either uplink or downlink) with user data is more important than the communication direction without any user data. Conventional antenna systems in portable communication devices are not adjustable based on data activity.

Accordingly, there is a need for an apparatus, system, and method for managing an antenna network of a portable communication device.

SUMMARY OF THE INVENTION

An apparatus, system, and method dynamically adjust an antenna network frequency response in accordance with an operation mode of a half duplex call. One of a plurality of antenna network configurations is selected based at least partly on the half duplex operation mode which comprises a talk mode and a listen mode. When the portable communication device is in a listen mode, the antenna network is tuned to a reception configuration which results in a reception efficiency that is greater for at least a portion of a reception frequency band than the reception efficiency resulting from at least one other antenna network configuration. The antenna network is maintained in a default configuration unless antenna adjustment conditions are met. In some situations, the antenna network is set to a transmission configuration to improve transmission efficiency relative to the default configuration.

DETAILED DESCRIPTION

In a first exemplary embodiment, the antenna network is maintained in a default configuration and dynamically tuned to a reception configuration under certain conditions during the listen mode of a half duplex call. The reception frequency response results in greater reception efficiency for at least a portion of a reception frequency band than the reception efficiency resulting from the default frequency response. In the first exemplary embodiment, therefore, an antenna system configuration is selected from two antenna configurations including a reception configuration and a default configuration to tune the antenna network to have either the reception frequency response or the default frequency response. In some circumstances, the plurality of antenna system configurations may include more than two configurations with corresponding frequency responses. For example, as discussed below with reference to a second exemplary embodiment, the antenna network may be tuned to have a transmission frequency response resulting in a greater transmission efficiency within at least a portion of the transmission frequency band as compared to the default frequency response and the reception frequency response. In the second exemplary embodiment, the antenna network is maintained in a default configuration unless conditions are met to configure the antenna network to the reception configuration or the transmission configuration. Accordingly, during half duplex communication, the link budget resource of the inactive or less active link (forward or reverse) may be transferred to the more active link by changing the antenna configuration without affecting the other operations or signals of the communication system such as, for example, power control functions and control messages.

Figure 1:
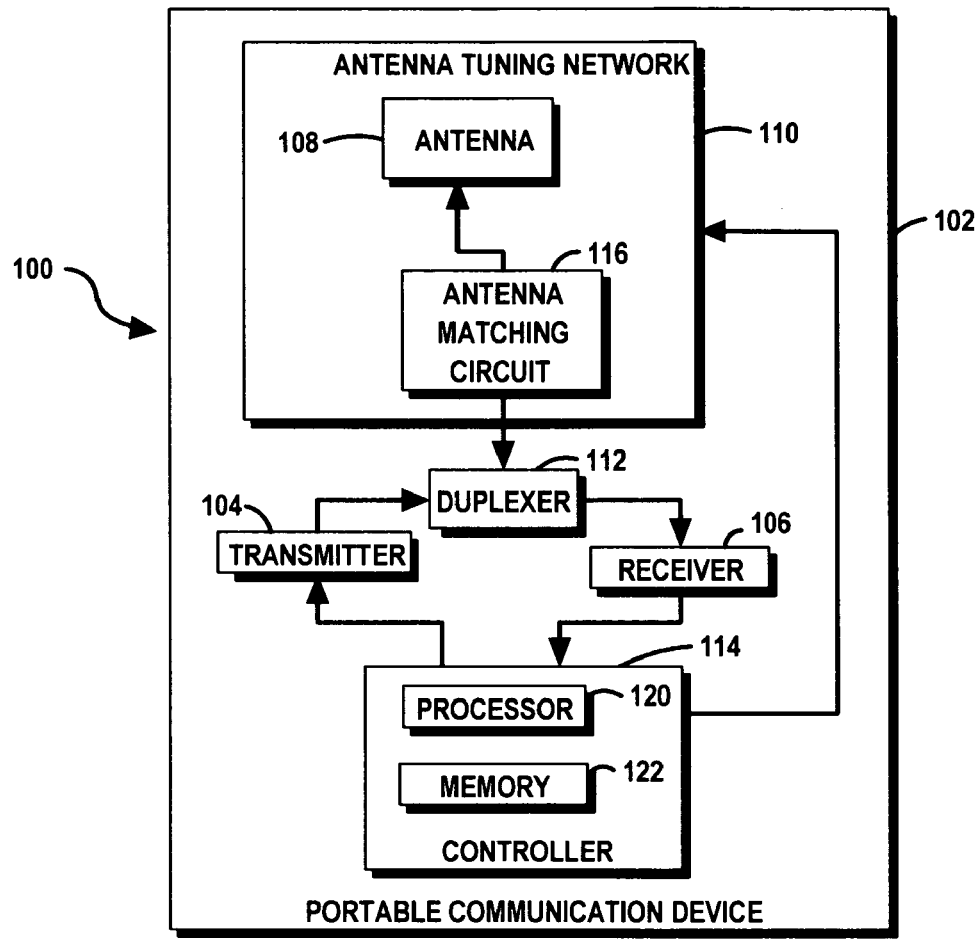
FIG. 1 is a block diagram of an antenna system within a portable communication device in accordance with exemplary embodiments of the invention.

FIG. 1 is a block diagram of an antenna system 100 within a portable communication device 102 in accordance with the exemplary embodiments of the invention. The portable communication device 102 includes a transmitter 104 and receiver 106 connected to the antenna system 100 and is configured to wirelessly communicate within a communication system through the antenna 108. Data and control signals are transmitted by the portable communication device 102 by transmitting electromagnetic signals through the antenna system 100. The antenna system 100 includes an antenna network 110, a duplexer 112, and at least a portion of the controller 114 in the exemplary embodiment. The antenna system 100 may include other components such as filters and switches, for example. The antenna tuning network 110 includes at least an antenna matching circuit 116 and, in the exemplary embodiments, also includes the antenna 108. In response to control signals generated by the controller 114, the antenna network 110 is configured in one of at least two configurations including a default configuration and a reception configuration. In the exemplary embodiments, the frequency response of the antenna network 110 is changed by changing the characteristics of the antenna matching circuit 116. In some situations, the characteristics of the antenna 108 may also be manipulated to change the frequency response. Accordingly, the antenna 108 is illustrated as part of the antenna tuning network 110 in FIG. 1. The antenna matching circuit 116 includes an impedance variable device such as field effect transistor (FETs), bipolar transistors, PIN diodes, ferroelectric capacitors, varactor diodes, and microelectromechanical systems (MEMS) switches that respond to control signals to dynamically adjust the operational characteristics of the antenna matching circuit 116 and/or the antenna 108. Although in the exemplary embodiment the antenna system characteristics are changed by adjusting the antenna matching network 116, other techniques may be used to tune the antenna efficiency characteristics. Tunable parasitic elements, for example, may be used to change the antenna characteristics. The duplexer 112 facilitates the use of the single antenna 108 by both the transmitter 104 and the receiver 106. Accordingly, connections are maintained between the antenna network 110 and the transmitter 104 and between the antenna network 110 and the receiver 106. During a half duplex call such as push-to-talk (PTT) call or a one-way file transfer, the antenna network 110 is tuned, configured, or otherwise biased to increase the antenna efficiency in the direction of the half duplex communication. During a half duplex call in a full duplex system such as a cdma200 1X system, control or other signals may be simultaneously transmitted in the opposite direction of the half duplex communication. For example, control signals transmitted in the forward link may be received at the portable communication device 102 while the user presses the PTT button and voice signals are transmitted in the reverse link. As explained below, the selection of the frequency response is based at least partly on the communication data rate in the reverse and forward links where the communication data rates may be zero (e.g. no data in the communication direction). In some communication systems that provide half duplex service such as Global System for Mobile Communications (GSM) systems, for example, signals are only transmitted in one communication direction at any particular time.

The antenna system 100 may be implemented within any of numerous types of devices and wireless communication systems where electromagnetic signals are exchanged through an antenna system 100. In the exemplary embodiment, the antenna system 100 is part of a portable communication device 102 operable in accordance with Code Division Multiple Access (CDMA) standards such as cdma2000 1X, 1xEV-DO, and W-CDMA. The techniques and devices discussed herein may be implemented in other types of communication systems such as systems utilizing GSM or Orthogonal Frequency Division Multiplexing (OFDM) based standards for example. The portable communication device 102 may be a cellular telephone, wireless modem, personal digital assistant (PDA) or other device that exchanges electromagnetic signals with a fixed or portable communication device. In the exemplary embodiment, the portable communication device 102 includes other hardware, software, and firmware not shown in FIG. 1 for facilitating and performing the functions of a portable communication device 102. For example, the portable communication device 102 includes input and output devices such as keypads, displays, microphones and speakers. Further, the functions and operations of the blocks described in FIG. 1 may be implemented in any number of devices, circuits, or elements. Two or more of the functional blocks may be integrated in a single device and the functions described as performed in a single device may be implemented over several devices. For example, at least portions of the transmitter, receiver, and antenna system 100 may be implemented within a single integrated circuit such as an application specific integrated circuit (ASIC).

The antenna system 100 includes at least the antenna network 110, and portions of the controller 114. As explained above, the antenna network 110 includes the antenna 108 and the antenna matching circuit 116 in the exemplary embodiment. The antenna network 110, however, may include any combination or number of tunable and passive elements that provide a mechanism for dynamically changing the frequency response or other characteristics of the antenna 108. The antenna matching network 116 is dynamically adjusted by control signals generated by the controller 114. The antenna matching circuit 116, therefore, includes one or more devices that are responsive to control signals generated by the controller 114. Examples of suitable tunable devices within the antenna matching circuit 116 include elements such as field effect transistor (FETs), bipolar transistors, PIN diodes, ferroelectric capacitors, varactor diodes, and microelectromechanical systems (MEMS) switches.

Depending on the particular antenna design, the antenna 108 may be tunable using one or more tunable devices. One or more tunable parasitic elements may be incorporated in the antenna system to change the characteristics of the antenna in some circumstances. Examples of some suitable tunable parasitic elements include metal structures placed in proximity of the active element, using specific spacing. Suitable techniques for tuning include switching to connect and disconnect the parasitic elements to ground. Other techniques may include using a tunable element between the parasitic element and ground.

The controller 114 changes the frequency response of the antenna 108 by adjusting control signals to the antenna tuning network 110 which may result in changes to the antenna 108, and/or antenna matching circuit 116. Therefore, the antenna network 110 may include a mechanism for changing the electrical characteristics of the antenna 108 to tune the antenna 108 in some situations.

The antenna 108 may be any dipole, patch, Planar Inverted "F" (PIFA), inverted F, monopole, balanced antenna, or stubby antenna that can exchange signals with the communication system. The particular antenna type of the antenna 108 is selected based on the operating frequencies and bandwidth, power levels used by the portable communication device 102, and in accordance with other design parameters such as efficiency, size, impedance, durability, gain, polarization, cost and weight.

The controller 114 is any device, circuit, integrated circuit (IC), application specific IC (ASIC), or other configuration including any combination of hardware, software and/or firmware that performs the functions described herein as well as facilitating the overall functionality of the mobile communication device 102. In the exemplary embodiment, the controller 114 includes a processor 120 and a memory 122. The processor 120 is any computer, processor, microprocessor, or processor arrangement that executes software code to perform the calculation and control functions described herein. The memory 122 is any memory device, IC, or memory medium suitable for storing code and data that can be accessed by the processor 120. The controller 114 may include other devices, circuits and elements not shown in FIG. 1 that facilitate the exchange of signals and perform other interface functions. For example, the controller 114 includes digital to analog (D/A) converters to provide analog control signals to the antenna network 110 in some circumstances.

In the exemplary embodiment, the portable communication device 102 is operable within a full duplex communication system to provide half duplex service as well as full duplex service. As discussed herein, half duplex service and a half duplex call includes non-simultaneous two-way data or voice communication such as PTT communication or one-way file transfers. In a full duplex system, signals other than data signals may be exchanged in the opposite direction to the half duplex data transmission or half duplex voice transmission (PTT) direction. The half duplex service and half duplex call, therefore, appear to the user as a PTT call or data call with one way file transfer although other signals may be exchanged in the opposite direction. Although the half duplex service is provided in a full duplex communication system in the exemplary embodiment, the half duplex service and the half duplex call may be established in a half duplex communication system in some situations. Although the half duplex techniques are described with reference to PTT communication in the exemplary embodiment, the techniques may be extended to other half duplex communication, such as one-way file transfers, for example based on the teachings herein. Accordingly, the talk mode includes reverse link transmissions where the user is talking as well as one-way file transfers from the portable communication device to the communication network. The listen mode includes receiving forward link voice PTT signals at the portable communication device transmitted by another PTT user through the communication network and one-way file transfers received at the portable communication device 102. In the first exemplary embodiment, the antenna network 110 is dynamically adjusted during half duplex communication to bias the antenna system 100 for improved performance during the listen mode. As discussed with reference to the second exemplary embodiment, the antenna system 100 may be adjusted to provide improved performance in the talk mode in some circumstances. In response to control signals generated by the controller 114, the antenna network 110 is configured to one of at least two configurations including a default configuration and reception configuration in the first exemplary embodiment. As explained above, the antenna network 110 includes at least one tunable element 116 that can be adjusted by the controller 114 to change the characteristics of the antenna system 100 and change the frequency response. Accordingly, the antenna system 100 is configured to a receive configuration or a default configuration by adjusting one or more tunable elements connected to the antenna 108 and/or the antenna matching circuit 116 in the first exemplary embodiment.

Figure 2:
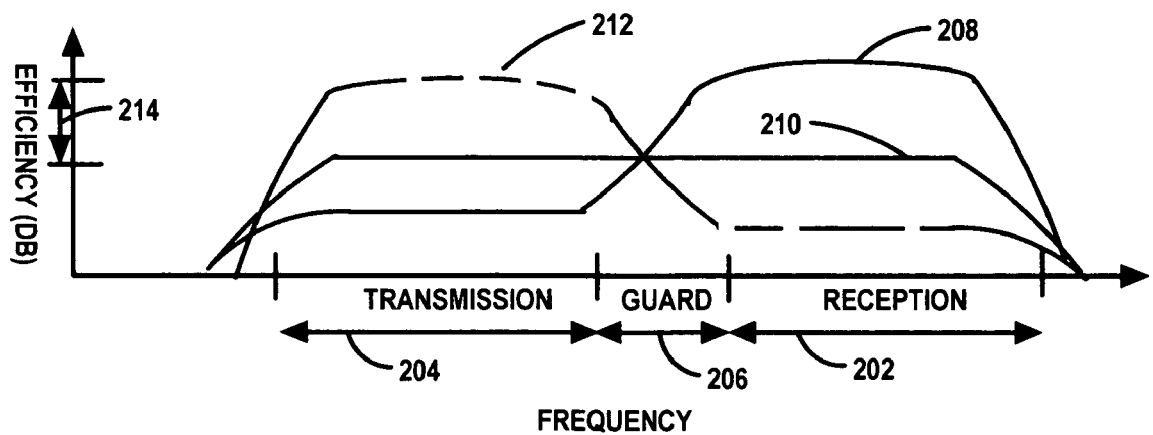
FIG. 2 is a graphical illustration of an antenna frequency response of the antenna in a default configuration, reception configuration, and a transmission configuration in accordance with the exemplary embodiments.

FIG. 2 is a graphical illustration of an antenna frequency response of the antenna network 110 in a default configuration, reception configuration, and a transmission configuration in accordance with the exemplary embodiment. Forward link signals are received within a potable device reception band (reception band) 202 and reverse link signals are transmitted within a portable device transmission band (transmission band) 204 in accordance with the particular communication standard of the communication system. The transmission band 204 and reception band 202 are separated by a guard band 206 in the exemplary embodiment. Where the communications are in accordance with frequency division duplexing (FDD) techniques, each transmission channel may include a frequency pair that includes a forward (or downlink) frequency channel within the reception band (forward link band) 202 and a reverse (or uplink) frequency channel within the transmission band (reverse link band) 204. In direct sequence spread spectrum communications such as CDMA, pseudorandom codes are used to spread the voice or data information over each transmit channel and reception channel which correspond to the bands 202, 204 in FIG. 2.

During a half duplex call, such as during a PTT call or a one-way file transfer, the antenna network 110 is tuned to one of at least two configurations that result in a reception frequency response 208 or a default frequency response 210. In the exemplary embodiment, the default configuration results in an unbiased or normal frequency response (210) where the overall performance is optimized for both forward link and reverse link signals. An example of a suitable default configuration in a portable communication device 102 capable of full duplex communication includes the configuration selected for full duplex service. In the second exemplary embodiment, a transmission configuration is used to provide a transmission frequency response 212. The antenna system 100 is configured to the transmission configuration during situations when the reception of forward link control message is not anticipated or the importance of transmitting a message outweighs the possibility of receiving a control message from the communication network. In most communication systems, a control message targeted for the portable communication device 102 may be sent multiple times in order to increase the likelihood that the portable communication device receives the control message (e.g. in a fading channel). Therefore, even if the portable communication device 102 does not receive the first instance of a control message, the control message is repeated after a specified period of time without a response from the portable communication device 102. If the portable communication device 102 sends a control message requiring acknowledgement from the communication network the portable communication device is not configured in the transmission configuration in the second exemplary embodiment since a control message (acknowledgement) from the communication network is anticipated.

In the first exemplary embodiment, the antenna network 110 is maintained to have the default frequency response 210 and tuned to have a reception frequency response 208 when conditions are met in the listen mode. Therefore, in the portable communication device 102, the antenna system 100 is tuned to the default configuration resulting in the default frequency response 210 which results in higher antenna transmission efficiency for at least a portion of the transmission band (reverse link) 204 relative to the antenna transmission efficiency in the reception configuration during the talk mode. In some situations, switching to the default configuration may not necessarily result in a higher transmission efficiency for the particular channel as compared to the transmission efficiency in the reception configuration. During the listen mode, the antenna network 110 is tuned to the reception configuration resulting in the reception frequency response 208 which results in higher antenna efficiency 214 for at least a portion of the reception band (forward link) 202 relative to the reception band antenna efficiency in the default configuration. Accordingly, the reception efficiency of the antenna system 100 is increased over the reception (forward link) band 202 during the listen mode. In the talk mode, neither the transmission efficiency nor the reception efficiency is enhanced. The antenna system 100 may be tuned to more than two configurations in some circumstances. For example, where the portable communication device 102 operates in more than one system having different operating frequencies, two configurations may be used for each system.

In the exemplary embodiments, signals are transmitted in accordance with cdma2000 1X techniques where reverse link signals are transmitted from the portable communication device 102 to the communication network and forward link signals are transmitted from the communication network to the portable communication device 102. The communication network supports push-to-talk (PTT) communication where the portable communication device 102 either transmits reverse link signals during a talk mode or receives forward link signals in a listen mode in accordance with half duplex communication. As discussed above, the half duplex communication in PTT applies to the voice packets and not the control messages since the control messages can be sent on either the forward link or the reverse link when the portable communication device 102 is in the talk mode or the listen mode. In the exemplary embodiments, while a PTT session is active in cdma2000 1X, the active session is served in the forward link by the Forward Pilot Channel (F-PICH) and the Forward Fundamental Channel (F-FCH) while the reverse link is supported by the Reverse Pilot Channel (R-PICH) and the Reverse Fundamental Channel (R-FCH). Other channels, such as the supplemental channel for example, may also be used in conjunction with these channels. When the user is listening, the F-PICH, F-FCH, and R-PICH are necessary. The R-PICH carries forward power control bits punctured into the R-PICH, where the forward power control bits are sent from the portable communication device 102 to the base station in the communication network to allow the base station to control traffic channel power for the dedicated users. In accordance with the exemplary embodiment, the R-FCH is only needed for signaling messages in the listen mode since no user information is transmitted in the listen mode.

In a static environment there may be no signaling messages transmitted from the portable communication device 102. When signaling messages are sent, the portable communication device 102 tunes the antenna to accommodate R-FCH at full rate (i.e. 9600 bps in RC3 or 14400 in RC4) only for frames that contain signaling messages. Therefore, if the PTT call is in the listen mode (i.e. Rx configuration) before signaling messages are sent, the portable communication device 102 tunes the antenna system 110 from the reception configuration to the default configuration.

Figure 3:
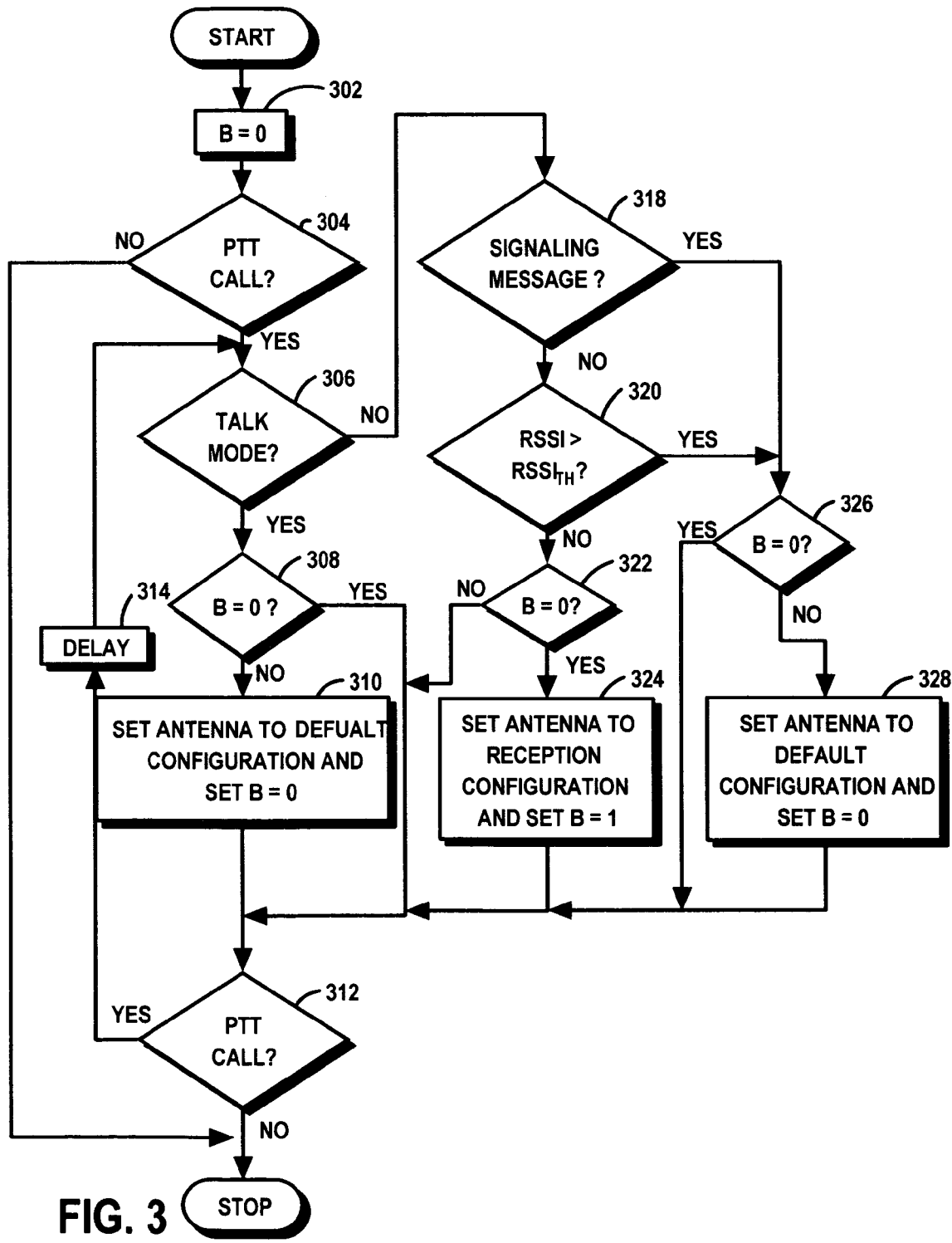
FIG. 3 is a flow chart of a method of managing the antenna system in accordance with a first exemplary embodiment.

FIG. 3 is a flow chart of a method of managing the antenna system 100 in accordance with the first exemplary embodiment of the invention. In the first exemplary embodiment, the antenna network 110 is maintained in the default configuration and tuned to a reception configuration during the listen mode in a half duplex call when certain conditions are met. The method described with reference to FIG. 3 is executed after the portable communication device 102 has established a call through the communication system.

At step 302, an antenna bias flag (B) is set to 0 indicating that the antenna network 110 is tuned to the default configuration. In the exemplary embodiment, the default configuration is an unbiased configuration that is optimized for maximum performance in both the reverse link and forward link. In some situations, however, the default configuration may be biased to improve performance in one of the communication directions.

At step 304, it is determined whether the call is a PTT call. If the call is a PTT call, the method continues at step 306. Otherwise, the method is stopped.

At step 306, it is determined if the portable communication device 102 is in the talk mode. In the exemplary embodiment, the controller 114 determines if the user has activated the talk mode by activating the talk switch, for example. If the portable communication device 102 is not in the talk mode, the method continues at step 316. If the portable communication device 102 is in the talk mode, the method continues at step 308.

At step 308, it is determined if the bias flag is set to the default configuration. If the antenna bias flag is set to 0 indicating that the default configuration is active, the method continues at step 312. Otherwise, the method proceeds to step 310 where the antenna configuration is set to the default configuration and the antenna bias flag is set to 0.

At step 312, it is determined whether the PTT call is still active. If the PTT call is still active, the method returns to step 306 after a delay at step 314. The delay in the exemplary embodiment is one frame. The one frame delay provides a mechanism for monitoring the next frame and to avoid skipping a frame. An example of suitable monitoring technique includes monitoring the beginning of each frame to determine if voice packets are sent. Accordingly, the one frame delay does not require continually monitoring the remainder of the same frame. If the PTT call is no longer active, the method stops.

If it is determined at step 306, that the portable communication device 102 is not in the talk mode, the portable device is the listen mode and the method continues at step 318 where it is determined whether a signaling message is being sent by the portable communication device 102. If a signaling message is being sent, the method proceeds to step 326.

If no signaling message is being sent, the method continues at step 320, where it is determined whether the received signal strength indicator (RSSI) is greater than a RSSI threshold ($RSSI_{TH}$). The threshold is selected to minimize adjustment of the antenna frequency response in situations when additional reception gain is not necessary or will provide marginal overall improvement in the communication performance. Accordingly, step 320 determines if the reception quality is at a level where increased gain on the forward link will result in communication performance improvement. If the RSSI is greater than the RSSI threshold, the method continues at step 326. If the RSSI is less than or equal to the RSSI threshold, the method continues at step 322. Alternately, other quality indicators such as Pilot Ec/lo, Tx power, Rx power, frame error rate may also be used in conjunction with RSSI.

At step 326, it is determined whether the bias flag is set to the default configuration. If the antenna bias flag is set to 0 indicating that the default configuration is active, the method continues at step 312. Otherwise, the method proceeds to step 328 where the antenna configuration is set to the default configuration and the antenna bias flag is set to 0 before the method continues to step 312.

A step 322, it is determined whether the bias flag is set to the default configuration. If the antenna bias flag is set to 1 indicating that the reception configuration is active, the method continues at step 312. Otherwise, the method proceeds to step 324 where the antenna configuration is set to the reception configuration and the antenna bias flag is set to 1 before the method continues to step 312.

Accordingly, communication resources are shifted from the reverse link to the forward link during the receive mode by tuning the antenna system 100 and increasing the reception gain over at least a portion of the reception band 202. The following example illustrates the exemplary antenna system 100 tuning method in further detail when the method is executed in a CDMA communication system. When the portable communication device 102 is in the talk mode during a PTT session, both the R-PICH and the R-FCH are active. If the R-FCH is operating in Radio Configuration 3 (RC3) at 9600 bps with 20 ms frames, the R-FCH is set to 3.75 dB above the R-PICH level. This means 70% of the total MS transmit power is from the R-FCH and the other 30% is corresponds to the R-PICH. If the total TX power is 20 dBm, the R-PICH is transmitting at 14.7 dBm and the R-FCH is transmitting at 18.5 dBm. When the portable communication device 102 is in the listen mode during a PTT call, the R-FCH is operating in the lowest rate (i.e. 1500 bps in RC3), and the R-FCH level is 5.88 dB below the R-PICH. As a result, only about 21% of the TX power is in the R-FCH. The forward power control bits are punctured into the R-PICH and since the R-PICH would transmit the same power whether the portable communication device 102 is in the talk mode or in the listen mode, the R-PICH alone is transmitting at 14.7 dBm in either mode while the R-FCH is transmitting at 8.9 dBm for a total TX power of 15.7 dBm. As a result the difference in transmission power between the talk mode and listen mode is approximately 4.3 dB. Therefore, when the antenna system 100 is tuned to the reception mode during a PTT listen mode to favor the forward link, the reduction in the TX antenna gain should not affect the performance of the CDMA system since less resource is needed for R-FCH at the lowest rate.

During a one-way forward link data transfer to the portable communication device 102, the reverse link activity is minimal and the antenna 108 may be biased in favor of the forward link. In some circumstances, the degree of the bias depends on the forward data rate since higher data rates place a higher demand on forward link budget. When the portable communication device 102 is operating near the edge of coverage or in poor coverage regions such as coverage holes, the margin available in the link budget available for either (or both) the forward or the reverse link may determine the user's perceived quality of a call or whether or not the call gets dropped. Therefore, as in the example above, when the transmission power is reduced due to inactivity, the antenna 108 is tuned to favor the forward link and increase the available link budget for the forward link and improve the call quality. The above example applies to the process of biasing the antenna 108 in favor of the forward link when user data is not transmitted on the reverse link. In some circumstances, antenna 108 is biased in favor of the reverse link when no user data is being transmitted on the forward link traffic channel(s). For example, the antenna system 100 may be set to the transmission configuration to improve reverse link communication as discussed below. Since signaling messages sent from the base station to the portable communication device 102 are not under the control of the portable communication device 102, the amount of bias applied in favor of the reverse link resulting in a decrease in reception gain within the forward link band is dependent on any excess link budget resource beyond the minimum link budget required to receive the forward signaling messages. As described below, the antenna system 100 may be set to the transmission configuration in circumstances where a forward link control signal is not anticipated or in circumstances where the importance to transmit the data signal outweighs the importance to receive the forward link control signal.

Figure 4:
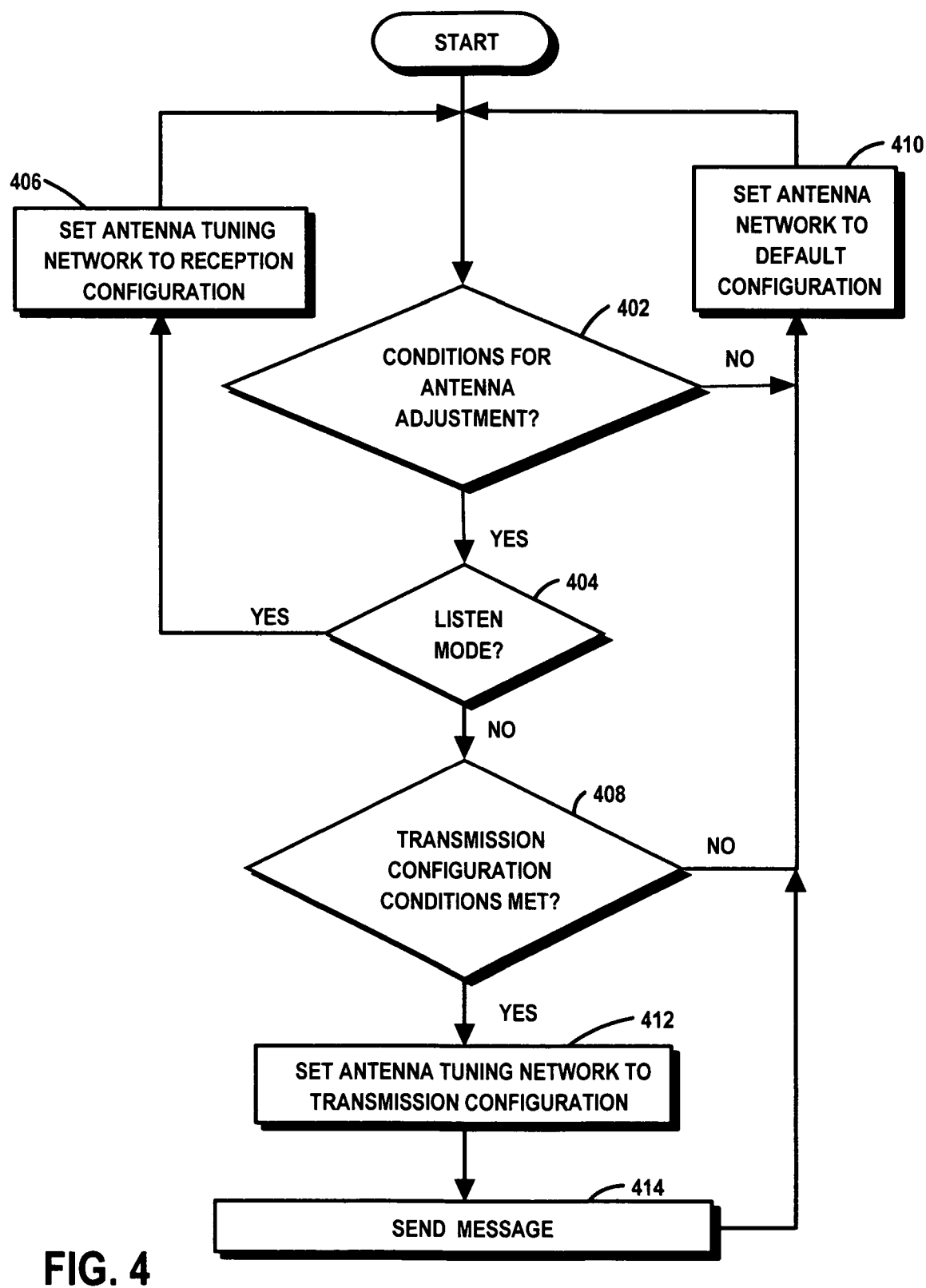
FIG. 4 is a flow chart of a method of managing the antenna system in accordance with a second exemplary embodiment of the invention.

FIG. 4 is a flow chart of a method of managing an antenna system 100 in accordance with the second exemplary embodiment. The exemplary method is performed by the portable communication device 102 operating in a communication system where the plurality of antenna network 110 configurations includes a default configuration, a reception configuration, and a transmission configuration.

At step 402, it is determined whether the conditions for antenna adjustment have been met. In the exemplary embodiment, the controller 114 determines if the half duplex call is currently-active. If a PTT call or a one way file transfer is currently in progress, the controller 114 determines that the antenna adjustment conditions are met. Other conditions may depend on RSSI or output power values. If the conditions are met, the procedure continues at step 404. Otherwise, the procedure continues at step 410 before returning to step 402 to monitor the antenna adjustment conditions.

At step 410, the antenna network 110 is set to the default configuration.

At step 404, it is determined whether the half duplex call is in a listen mode. As described above, the portable communication device 102 receives forward link signals transmitted in the forward link band in the listen mode. If the portable communication device 102 is in the listen mode the procedure continues at step 306. Otherwise, the procedure continues at step 408.

At step 406, the antenna network 110 is set to the reception configuration. In the exemplary embodiment, the controller 114 generates and provides control signals to the antenna network 110 to adjust the antenna frequency response to the reception frequency response 208. As discussed above, the reception frequency response 208 provides greater efficiency 214 within the forward link band 202 as compared to the transmission frequency response 212. After the antenna network 110 is set to the reception configuration, the procedure returns to step 402 to continue monitoring the conditions for antenna adjustment.

At step 408, it is determined whether conditions for switching to transmission configuration are met. In the exemplary embodiment, the default configuration is the unbiased configuration and the transmission configuration is used when certain conditions are met during the talk mode. The transmission configuration conditions may be based on any of numerous factors or parameters. In the exemplary embodiment, the transmission configuration conditions are met if the portable communication device is in a short message state where a relatively short message is to be transmitted and a transmission power level is above a threshold. In addition, no forward link control signals are anticipated during the duration of the transmission. If the transmission conditions are not met, the procedure continues to step 410. Otherwise, the procedure continues at step 412.

The transmission configuration conditions may include other conditions or criteria in some situations. For example, the conditions may include an urgent message state where an importance of accurately transmitting an urgent message outweighs other criteria. For example, an urgent message state may include situations where the portable communication device 102 is attempting to convey a control message to the base station and the base station cannot successfully demodulate signals from the portable communication device 102 due to inadequate received signal level at the base station of a control message transmitted at maximum power from the portable communication device 102. The portable communication device determined the control message is not received by the base station when an acknowledgement from the base station is not received. If the portable communication device can demodulate other packets sent from the base station, an urgent message condition is met.

At step 410, the antenna network 110 is set to the default configuration. As explained above, the default configuration results in a frequency response optimized for both the forward link and reverse link in the exemplary embodiment. After the antenna 108 is set to the default configuration, the procedure returns to step 402 to continue monitoring the conditions for antenna adjustment.

At step 412, the antenna network 110 is set to the transmission configuration. In the exemplary embodiment, the transmission configuration results in the transmission antenna frequency response 212 that provides additional efficiency 214 in the reverse link band as compared to the default configuration.

At step 414, the half duplex talk signal is transmitted through the reverse link band 204. After the message is transmitted using the transmission configuration, the antenna network 110 is set to the default configuration at step 410 before returning to step 402. Accordingly, the transmission configuration temporarily provides additional transmission efficiency in the reverse link band 204 during reverse link transmission.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method of managing an antenna system for transmitting and receiving signals at a portable communication device, the method comprising:
   adjusting an antenna network frequency response of an antenna network in accordance with an operation mode of a half duplex call to set the antenna network to a reception configuration in a listen mode where forward link data signals are received within a portable communication device reception band and reverse link control signals are transmitted through the antenna network, the reception configuration resulting in an antenna reception frequency response in the listen mode having greater efficiency of at least a portion of the portable communication device reception band than another frequency response resulting from another antenna network configuration.

2. The method of claim 1, wherein the reverse link control signals are transmitted within a cdma2000 1X Reverse Pilot Channel (R-PICH) and the forward link data signals are transmitted within a cdma2000 1X Forward Fundamental Channel (F-FCH).

3. The method of claim 1, wherein the adjusting comprises:
   configuring the antenna network to the reception configuration for the listen mode during a push-to-talk (PTT) call.

4. The method of claim 1, wherein the adjusting comprises:
   configuring the antenna network to the reception configuration for a one-way data transfer to the portable communication device.

5. The method of claim 1, wherein the adjusting comprises:
   unless antenna adjustment conditions are met, maintaining the antenna network in a default antenna configuration resulting in an antenna default frequency response, the antenna reception frequency response in the listen mode having greater efficiency for the at least a portion of the reception band than the default antenna frequency response.

6. The method of claim 1, wherein the adjusting comprises:
   when the portable communication device is in a talk mode where reverse link data signals are transmitted within a portable communication device transmission band and forward link control signals are received through the antenna network, setting the antenna network to an antenna transmission configuration resulting in an antenna transmission frequency response having greater efficiency for at least a portion of the portable communication device transmission band than the antenna reception frequency response.

7. The method of claim 6, wherein the forward link control signals are transmitted within a cdma2001X Forward Pilot Channel (F-PICH).

8. The method of claim 1, wherein the adjusting the antenna network comprises:
   adjusting an antenna matching network comprising at least one tunable element.

9. The method of claim 1, wherein the adjusting the antenna network comprises:
   adjusting a tunable element to tune an antenna of the antenna system.

10. The method of claim 1, wherein the adjusting comprises configuring the antenna network while maintaining a receiver connection between the antenna network and a receiver within the portable communication device and while maintaining a transmitter connection between the antenna network and a transmitter within the portable communication device.

11. An antenna system for transmitting and receiving signals at a portable communication device, the antenna system comprising:
    an antenna tuning network responsive to antenna network control signals to adjust an antenna system frequency response of the antenna system in accordance with an operation mode of a half duplex call by setting the antenna network to a reception configuration in a listen mode where forward link data signals are received within a portable communication device reception band and reverse link control signals are transmitted through the antenna network, the reception configuration resulting in an antenna reception frequency response in the listen mode having greater efficiency of at least a portion of the portable communication device reception band than another frequency response resulting from another antenna network configuration.

12. The antenna system of claim 11, further comprising:
    a controller configured to generate, when the portable communication device is in a listen mode, the antenna network control signals to set the antenna network to the reception configuration.

13. The antenna system of claim 12, wherein the controller is configured to configured the antenna network to the reception configuration for the listen mode during a push-to-talk (PTT) call.

14. The antenna system of claim 12, wherein the controller is configured to configure the antenna network to the reception configuration for a one-way data transfer to the portable communication device.

15. The antenna system of claim 12, wherein the controller is configured to maintain the antenna network in a default antenna configuration resulting in an antenna default frequency response unless antenna adjustment conditions are met, the antenna reception frequency response in the listen mode having greater efficiency for the at least a portion of the reception band than the default antenna frequency response.

16. The antenna system of claim 12, wherein the controller is configured to generate the antenna network control signals, when the portable communication device is in a talk mode where reverse link data signals are transmitted within a portable communication device transmission band and forward link control signals are received through the antenna network, to set the antenna network to an antenna transmission configuration resulting in an antenna transmission frequency response having a greater efficiency for at least a portion of the portable communication device transmission band than the antenna reception frequency response.

17. The antenna system of claim 16, wherein the forward link control signals are transmitted within a cdma2001X Forward Pilot Channel (F-PICH).

18. The antenna system of claim 11, wherein the antenna network comprises:

at least one tunable element.

19. The antenna system of claim 18, wherein the at least one tunable element comprises at least one tunable antenna element in the antenna system and is responsive to the control signals to tune the antenna.

20. The antenna system of claim 11, wherein the reverse link control signals are transmitted within a cdma2000 1X Reverse Pilot Channel (R-PICH) and the forward link data signals are transmitted within a cdma2000 1X Forward Fundamental Channel (F-FCH).

* * * * *